United States Patent
Pizurica et al.

(10) Patent No.: US 9,715,661 B2
(45) Date of Patent: Jul. 25, 2017

(54) TOOL FOR MODELLING, INSTANTIATING AND/OR EXECUTING A BAYESIAN AGENT IN AN APPLICATION

(71) Applicant: WAYLAY BVBA, Sint-Amandsberg (BE)

(72) Inventors: Veselin Pizurica, Ghent (BE); Piet Vandaele, Ghent (BE)

(73) Assignee: WAYLAY BVBA, sint-amandsberg (BE)

( * ) Notice: Subject to any disclaimer, the term of this patent is extended or adjusted under 35 U.S.C. 154(b) by 291 days.

(21) Appl. No.: 14/529,293

(22) Filed: Oct. 31, 2014

(65) Prior Publication Data
US 2016/0125304 A1 May 5, 2016

(51) Int. Cl.
G06N 5/04 (2006.01)
G06N 7/00 (2006.01)

(52) U.S. Cl.
CPC .............. *G06N 7/005* (2013.01); *G06N 5/04* (2013.01)

(58) Field of Classification Search
None
See application file for complete search history.

(56) References Cited

U.S. PATENT DOCUMENTS 7,974,733 B2    7/2011   Gupta et al.

FOREIGN PATENT DOCUMENTS

WO    2012140152 A1   10/2012

OTHER PUBLICATIONS

Naish, et al., An Open Architecture for Intelligent Multisensor Integration Industrial Applications, Proceedings of the SPIE International Conference on Architectures, Networks, and Intelligent Systems for Manufacturing Integration, Oct. 13-17, 1997, pp. 1-9.*
Pearl, Judea, "Probabilistic Reasoning in Intelligent Systems: Networks of Plausible Inference", The Morgan Kaufmann Series in Representation and Reasoning, Revised Second Printing, Department of Computer Science, University of California, Los Angeles, Morgan Kaufmann Publishers, Inc., San Francisco, California, 40 pages, 1988.

\* cited by examiner

*Primary Examiner* — Wilbert L Starks
(74) *Attorney, Agent, or Firm* — Workman Nydegger (57) ABSTRACT

According to a first aspect, the invention relates to a tool for modelling, instantiating and/or executing a Bayesian agent in an application. The tool comprises a modelling module which is adapted to enable a user to determine a template for the Bayesian agent. The template comprises a Bayesian network, which comprises nodes and/or node-level metadata. The node-level meta-data at least defines node behavior and/or an association of a node with a software defined sensor and/or one or more software defined actuators. Also the template comprises template-level metadata at least defining lifecycle properties for the Bayesian agent. The template is suitable to be instantiated and executed as the Bayesian agent instance.

15 Claims, 7 Drawing Sheets

TOOL FOR MODELLING, INSTANTIATING AND/OR EXECUTING A BAYESIAN AGENT IN AN APPLICATION

TECHNICAL FIELD

The disclosure relates to the field of designing, modelling or developing Bayesian agents, wherein Bayesian networks are modelled for decision making.

More particularly, the disclosure is related to field of embedded computing devices or systems in a so-called Internet-of-Things (IoT). These devices or systems are able to interact with the environment by collecting data via sensors and by acting on that environment via actuators.

BACKGROUND

Many applications exist to implement reasoning, decision or automation algorithms. A first method is manual decision making, wherein data is inspected and decisions are taken manually. Another method is scripting, i.e. using 'if-then-else' constructs of a programming language. Other algorithms are e.g. based on flow-chart and BPM (Business-Process-Management) models.

Problems and disadvantages of these methods are manifold. These algorithms are not suited when working in environments which cannot be completely observed or wherein the domain knowledge is incomplete, or when unreliable, noisy or incomplete data require probabilistic reasoning. Another problem arises when the number of root causes for a problem is so large, that it is impossible to enumerate them all explicitly.

A solution for above mentioned problems are methods based on Bayesian networks. This graph modeling technology uses probabilistic reasoning, i.e. reasoning under uncertainty. A typical application is found in artificial intelligence technology.

Bayesian networks are useful when the logic comprises many different sources of information with a large number of states. Bayesian networks are more amenable to asynchronous information flows, i.e. not all information streams are synchronized. Hereby the reasoning or 'inference' of Bayesian networks can run continuously.

Document U.S. Pat. No. 7,974,933 discloses for example a method for using a Bayesian network to evaluate the efficacy of mathematical models for system behavior. Herein, typical use of Bayesian networks is found in engineering projects such as aircraft design. Document WO 2012/140152 discloses a Bayesian network comprising nodes associated with outdoor lighting devices. The nodes in Bayesian networks in other words can be associated with sensors.

A problem of the existing solutions is that Bayesian agents implementing such Bayesian networks, are developed ad hoc and are therefore not easily reusable across applications.

Another problem is that writing code for or programming such Bayesian agents and networks is not easy. There is a need for more convenient methods to develop and use Bayesian agents with reduced requirements to manually write code.

Hence, there is a need for a quicker development of Bayesian agents, together with a need for a better reusability and scalability.

SUMMARY

In order to develop and use Bayesian agents in a more convenient and quicker fashion, a framework is needed allowing a better reusability and scalability.

This objective is achieved, in a first aspect, by a tool for modelling, instantiating and/or executing a Bayesian agent in an application, said tool comprising a modelling module adapted to enable a user to determine a template for said Bayesian agent, wherein said template comprises:
- a Bayesian network, comprising nodes and node-level meta-data, said node-level meta-data at least defining node behaviour and/or an association of a node with a software defined sensor and/or one or more software defined actuators;
- template-level metadata at least defining lifecycle properties for said Bayesian agent;
- wherein said template being suitable to be instantiated and executed as a Bayesian agent instance.

An advantageous aspect is that embodiments of the invention allow for the modelling of a template defining how a Bayesian network interacts with its environment in a structured and scalable way. The implementation of template-level metadata, comprising e.g. lifecycle properties of the agent, as well as node-level metadata, leads to various levels of abstraction for a Bayesian agent. When a template is instantiated, runtime data can be supplied, allowing to create Bayesian agents with different properties or settings from a same template. Examples of a file format for such a template file could be for instance XML, JSON, etc.

An association or reference of a node with a sensor and/or one or more actuators allows for a decoupling of the definition of software (SW) defined sensors and actuators from the definition of the Bayesian network and templates. Thereto, the SW defined sensors and/or actuators can interact with the Bayesian decision-making network via a structured framework. This is advantageous as it allows for developing and updating sensors and actuators without requiring any change to the definition of the template.

The term "Bayesian agent" in underlying disclosure should be understood as an agent comprising a Bayesian network, which collects data from an environment via software defined sensor(s) and can decide to trigger actuators, acting on the environment. The decisions to be made are established through the Bayesian network inference algorithm.

Such an agent can be executed e.g. as an API on a computing device. Such a computing device could comprise a computer, a server, a portable device, a mobile phone, a tablet computer, virtual machine, etc. Also, such a Bayesian agent can be established in a distributed way, wherein the Bayesian network, sensors and actuators are distributed over an internet-based and/or cloud-based network. An example is an interconnection of uniquely identifiable embedded computing devices within the existing Internet infrastructure, i.e. the "Internet-of-Things" (IoT). An example could be for instance an agent for setting the air conditioning in a room based on weather conditions obtained from the internet. Another example could be an agent for irrigating the soil, based on physical sensors as well as weather forecast information obtained from the internet. Also an agent could e.g. manage the replacement or repair of machine parts.

The term "software defined sensor" in underlying disclosure should be understood as a computer-implemented sensor that is able to collect data from an environment and return the data to a node of the Bayesian network. The returning of data can be provided e.g. in response to a request or via push functions. Sensor collected data can concern e.g. static or dynamic data obtained from a database, opening hours, spending habits of a user, weather data retrieved from the internet, data obtained from a customer profile from a CRM system, data retrieved from an application programming interface (API), data from manual text typing, etc. A software defined sensor can also collect data from physical sensors. Examples of SW defined sensors are amongst others a temperature sensor, an accelerometer, a microphone, a humidity sensor, a camera, a software system, etc. A sensor definition could comprise one or more states, sensor properties and produced raw data values.

The term "software defined actuator" in underlying disclosure should be understood as a computer-implemented actuator that is able to act on an environment as a result of a decision from the Bayesian network. Preferably, one or more actions can be associated with a node being in a state with a probability in a predefined range, e.g. exceeding a predefined threshold. Examples are amongst others writing data in a database, notify a person by sms, sending an e-mail, interacting with another software system, light bulb switching, logging something in a database, interacting with line-of-business applications, etc.

The term "Bayesian network" in underlying disclosure should be understood as a graphical structure or network comprising nodes and directed edges, wherein these nodes each represent a random variable. A directed edge corresponds to a probabilistic dependency among random variables of a parent node and a child node, wherein the edge is directed from the parent node towards the child node.

A Bayesian network corresponds to a directed acyclic graph (DAG) and is a probabilistic graphical model, which can be used to represent knowledge about an uncertain domain, such as in statistics, machine learning, artificial intelligence, etc. The conditional dependencies in the graph can for example be estimated by using statistical or computational methods. Hence, Bayesian networks combine principles from graph theory, probability theory, computer science, statistics, etc.

Bayesian networks are advantageous as they are both mathematically rigorous and intuitively understandable. They enable an effective representation and computation of the joint probability distribution (JPD) over a set of random variables. Given a Bayesian network that specified the JPD in a factored form, one can evaluate all possible inference queries by marginalization, i.e. summing out over "irrelevant" variables. Two types of inference support are typically considered: predictive support for node Xi, based on evidence nodes connected to Xi through its parent nodes (also called top-down reasoning), and diagnostic support for node Xi, based on evidence nodes connected to Xi through its children nodes (also called bottom-up reasoning). It is self-evident that other types of inference support can be envisaged in underlying disclosure.

The term "Bayesian inference" in underlying disclosure should be understood as a method of inference in which Bayes' rule is used to update the probability estimate for a hypothesis as additional evidence is acquired. Probabilistic inference computes the posterior probability distribution for a set of query variables, given some observed event (i.e. some assignment of values to a set of evidence variables). Efficient algorithms exist that perform inference in Bayesian networks. Hereby, reference is made to the disclosure "Probabilistic Reasoning in Intelligent Systems", from Pearl, J. (1988, Morgan Kaufmann, San Francisco).

Nodes without parent nodes of the Bayesian network are provided with prior probabilities for corresponding variables. The prior probabilities correspond to the likelihood of a node being in a particular state prior to any observation of the environment. Probabilities or logical conclusions for the variables of the other nodes can be derived based on the conditional probability dependencies via an inference algorithm on the network.

According to an embodiment, the template-level metadata comprises one or more of the following:
frequency setting(s) of executing the Bayesian agent;
trigger setting(s) of executing the Bayesian agent;
stop setting(s) of executing the Bayesian agent;
a data source identification.

Runtime-specific data can be supplied to Bayesian agents at instantiation time. This leads to a more convenient developing and reusable template of an agent.

In case runtime data is identical across all Bayesian agent instances, those runtime data may also be part of the template level metadata. As an example, if data is always sent to the same database, the connection settings for that database may be part of the template level metadata.

The terms "frequency setting(s) of executing the Bayesian agent" in underlying disclosure should be understood as comprising a setting on the frequency or how often a template instance is to be run or executed, for example once, more than once, etc.

The terms "trigger setting(s) of executing the Bayesian agent" in underlying disclosure should be understood as comprising a setting determining what triggers an execution of a template instance. Examples are manual triggering, scheduled triggering, triggering based on a certain event, etc.

The terms "stop setting(s) of executing the Bayesian agent" in underlying disclosure should be understood as comprising a setting whether there is stop criterion for executing the Bayesian agent. Examples are setting whether the agent runs forever or expires within a certain timeframe, whether the agent stops when a particular node in the Bayesian network reaches a certain state with certain posteriori probability (e.g. node A comprises state "OK" with probability higher than 90%), when an action has been triggered a predefined number of times, etc.

The term "data source identification" in underlying disclosure should be understood as a resource identification in case an external source pushes data to the instance without an explicit request from the instance (cfr. push mode). The identification indicates from which resource this particular node wants to receive data. The identification can e.g. map to a unique identifier of a physical sensor, a smartphone, an iBeacon, etc. It is possible to associate multiple resources to different multiple nodes in one Bayesian network. The external data sources push data to the instance (with values and data source identification), and those data are then propagated to the associated nodes, which in the end will feed underlying sensors with correct data. The data source identification on the node level has precedence over the definition on template level.

According to an embodiment, the template further comprises one or more references to one or more software defined sensors and/or one or more references to one or more software defined actuators.

References to sensors or actuators allow for a decoupling of the definition of SW defined sensors and actuators from the Bayesian network and templates. Hereby, the development and update of sensors or actuators do not require any change to the template definition.

According to an embodiment, the defined sensors and actuators are available from a library.

Such a library with software defined sensors or a library with software defined actuators, allows to supply decoupled software defined sensors and/or actuators with runtime data or provide them with properties at instantiating a corresponding template. A library of the sensors or actuators therein can be updated or changed, without adaptation of the Bayesian template.

According to an embodiment, the modelling module is further adapted to enable a user to determine sensor-level metadata and/or actuator-level metadata at least defining behaviour of respectively one or more software defined sensors and/or one or more software defined actuators.

Hereby, even further abstraction is available for setting sensor and actuator properties.

According to an embodiment, the node-level metadata comprises one or more of the following:
- one or more states corresponding a node;
- one or more probabilities corresponding to the one or more states of a node;
- frequency setting(s) of executing a sensor corresponding with a node;
- invocation setting(s) of executing an actuator corresponding with a node.

The terms "frequency setting(s) of executing a sensor corresponding with a node" in underlying disclosure should be understood as one or more settings or properties determining the frequency with which data is to be collected from an associated sensor (cfr. pull mode of a sensor). The collection frequency defined at the node level can override a collection frequency defined in the lifecycle properties at the template level.

The term "invocation setting(s) of executing an actuator corresponding with a node" in underlying disclosure should be understood as setting(s) comprising a window between two actuator invocations. For instance, such setting could define whether an actuator should be invoked once, every time, with back off, and/or not unless a given period has passed from the previous invocation. Preferably, these parameters can override similar parameters defined at the template level.

According to an embodiment, the node-level metadata comprises one or more of the following:
- one or more states corresponding a node;
- one or more probabilities corresponding to the one or more states of a node;
- a data source identification;
- a cost of a sensor observation;
- a reference to a node of a Bayesian network of another instance;
- a reference to a Markov (n-1) node;
- frequency setting(s) of executing a sensor corresponding with a node;
- invocation setting(s) of executing an actuator corresponding with a node;
- eviction policy setting(s) corresponding with a node.

The term "cost of a sensor observation" in underlying disclosure should be understood as a value representing a cost for executing a sensor. Such a cost can represent a real cost of e.g. a paid-for API call, but also a value corresponding to the time needed to execute a data collection, in case of e.g. a time critical application.

The term "a reference to a node of a Bayesian network of another instance" in underlying disclosure should be understood as that a node in the top level Bayesian network contains a reference to a node of a complete lower level Bayesian network of another instance. This referencing allows for an easy decoupling in complex systems, wherein a different expertise can be implemented per network and which is combined via the node association. For example, one wants to build a complex diagnostic system representing a car. A decoupling in e.g. electronics and mechanics for a car can be represented by separate Bayesian networks, which are linked via the referenced node. Also, as each Bayesian network can be independently updated, such decoupling enables a faster computation of the inference algorithm. Preferably, the node, comprising metadata of a reference to a node of a Bayesian network of another instance, comprises the same one or more states as the node referred to. Any change of the posteriori probability of the one or more states of the referred node thereby can be injected back to the node with the reference. These one or more states can then be seen as new priors by other nodes in the parent instance.

The term "a reference to a Markov (n-1) node" in underlying disclosure should be understood as a node in the Bayesian network different from the node corresponding to the node-level metadata. If this parameter is defined and assigned to a node, the instance will propagate the current state of this node to the Markov (n—1) node, before executing a sensor on the current node. In this way, Markov chains can be modeled using Bayesian networks. This way, state changes of a sensor over time can be modelled.

The term "eviction policy setting(s) corresponding with a node" in underlying disclosure should be understood as setting(s) defining a duration during which the last observation remains valid. For instance, in case of data unavailability due to network outage or a broken sensor, the eviction policy could determine how soon the state of the node should return to the prior probability. The eviction policy could also determine the dumping, i.e. how fast the state needs to go back to the priors in case of the lack of data. Possible implementations are a setting whether the state needs to go immediately to the prior probability after eviction policy is applied, or a setting wherein the states are represented with "updated priors" which are gradually moving back to the initial prior configuration.

According to an embodiment, the tool is provided with an instantiating module for instantiating the Bayesian agent template, thereby generating the Bayesian agent instance.

According to an embodiment, the tool is provided with an executing module for executing the Bayesian agent instance.

According to an embodiment, the executing module is configured to:
- evaluate one or more nodes associated with one or more software defined sensors;
- execute one or more of the one or more software defined sensors;
- provide data from the one or more software defined sensors to one or more associated nodes;
- infer the Bayesian network;
- evaluate one or more nodes associated with one or more software defined actuators;
- execute one or more of the one or more software defined actuators.

According to an embodiment, the provided data from one or more software defined sensors concerns an observed state, a set of states and/or raw data.

According to an embodiment, the provision of sensor data comprises an injection of the observed state or the set of states as new prior probabilities into nodes associated with the sensor.

According to an embodiment, the raw data is provided to memory which is shared between the nodes of the Bayesian agent.

Data in the shared memory or 'instance context', which is common for all nodes of the Bayesian network allows more flexibility in handling large amounts of collected data from the environment.

The term "raw data" in underlying disclosure should be understood as data as received by the SW-defined sensor after sensor invocation.

According to an embodiment, the execution of an actuator is dependent on a probability of a state of a node associated with the actuator, whereby the probability is smaller than, equals and/or exceeds a predetermined threshold.

Implementing a predetermined threshold is advantageous as it allows for more degrees of freedom for decisions for actuators.

In a second aspect, embodiments of the invention relate to a computer-implemented method for modelling, instantiating and/or executing a Bayesian agent in an application, wherein the method comprises:
- determining a template for the Bayesian agent, the template comprising:
  a) a Bayesian network, comprising nodes and node-level meta-data, the node-level meta-data at least defining node behaviour and/or an association of a node with a sensor and/or one or more actuators;
  b) template-level metadata at least defining lifecycle properties for the Bayesian agent;
- and/or instantiating the template;
- and/or executing the Bayesian agent instance.

In a third aspect, embodiments of the invention relate to a computer program product comprising computer-executable instructions for performing the method according to the second aspect, when the program is run on a computer.

In a fourth aspect, embodiments of the invention relate to a computer readable storage medium comprising the computer program product according to the third aspect.

In a fifth aspect, embodiments of the invention relate to a data processing system programmed for carrying out the method according to the second aspect.

DETAILED DESCRIPTION OF EMBODIMENT(S)

Figure 1:
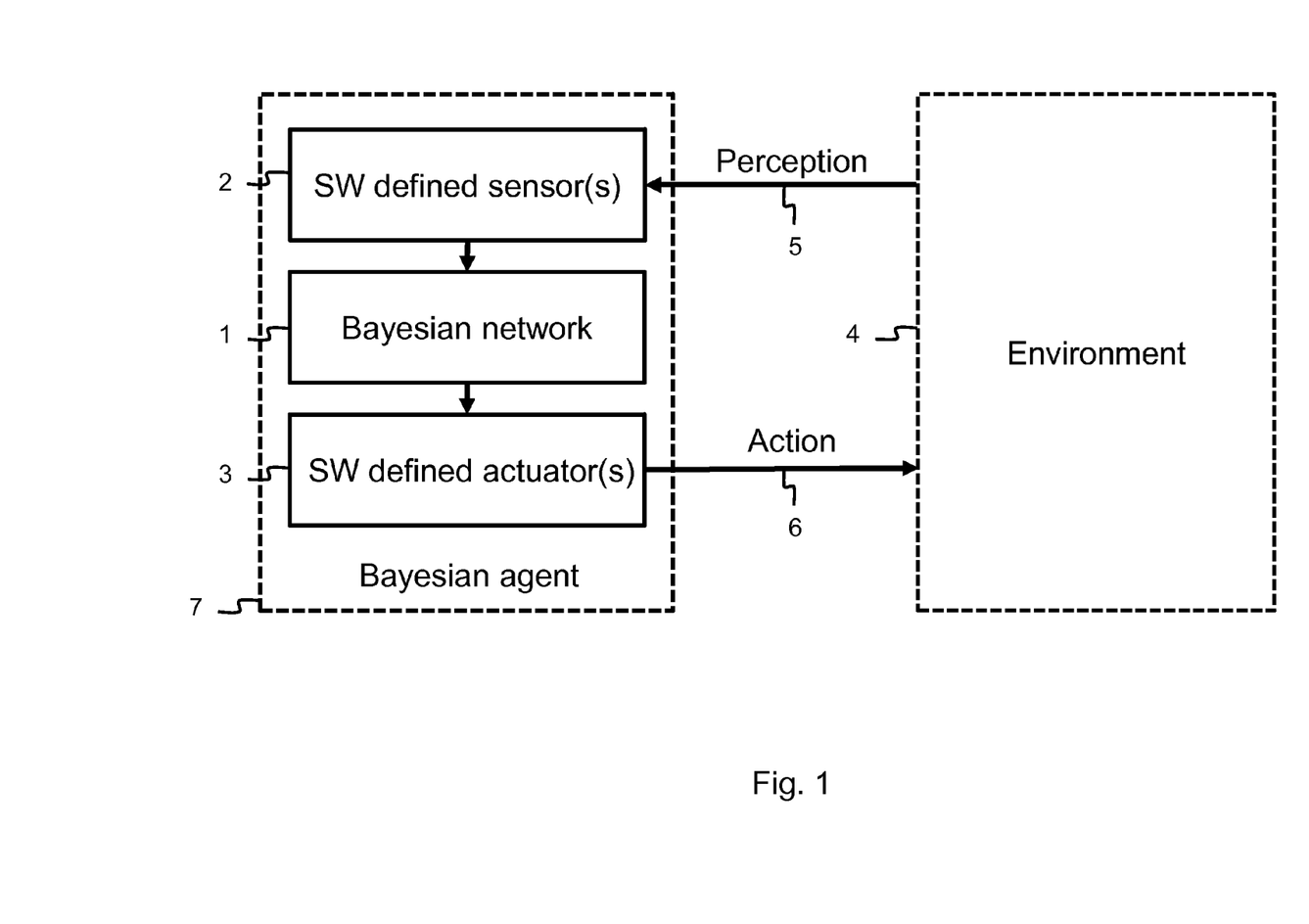
FIG. 1 schematically illustrates the interaction of a Bayesian agent with the environment according to an embodiment of underlying invention.

First, FIG. 1 will be described. FIG. 1 illustrates the interaction of a Bayesian agent 7 with the environment according to an embodiment of underlying invention.

The Bayesian agent 7 comprises the Bayesian network 1. The perception of data (arrow 5) from the environment is executed by the software defined sensor(s) 2 and/or is done by pushing data to the software defined sensor(s) 2 without an explicit request from the agent. Action (arrow 6) can be taken on that environment 4 by the software defined actuator(s) 3. Taking action depends on the decision-making based on the Bayesian network.

Figure 2:
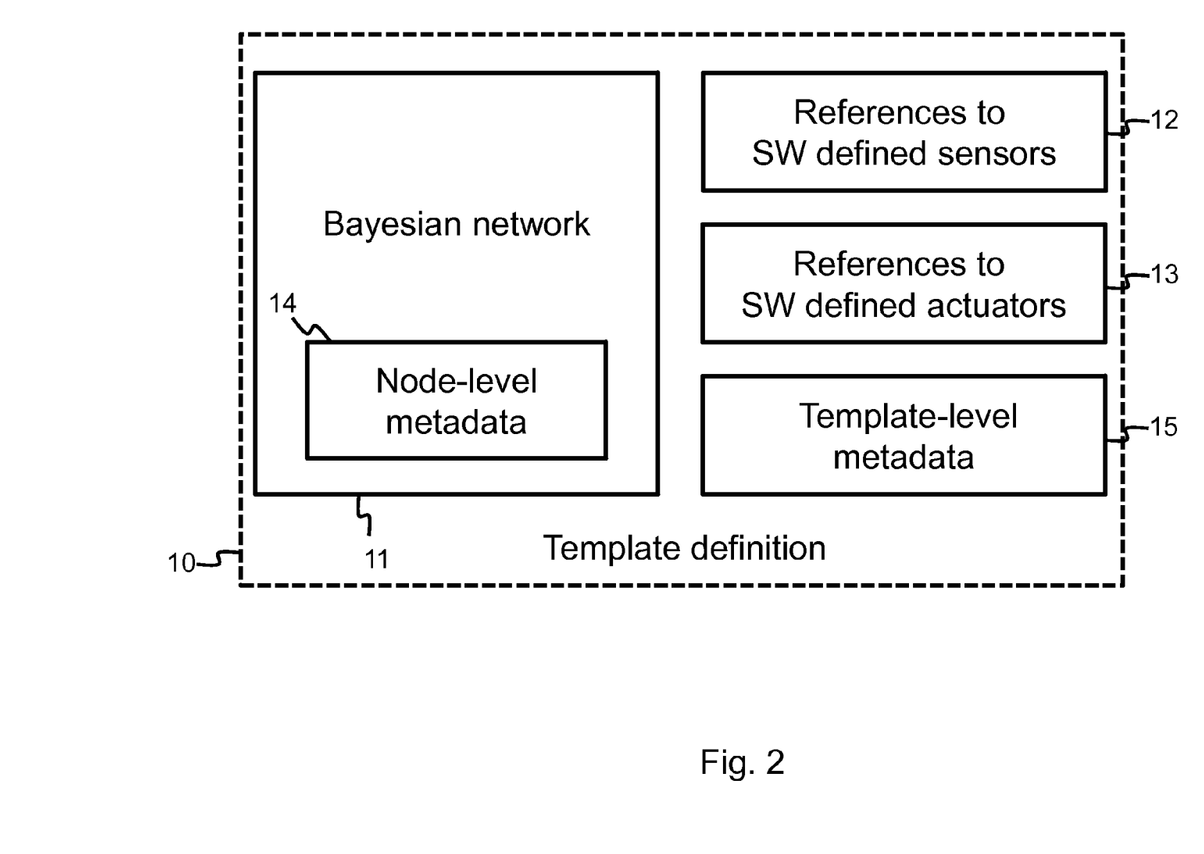
FIG. 2 schematically illustrates a template definition according to the embodiment of FIG. 1.

FIG. 2 schematically illustrates a template definition 10 for a Bayesian agent 7, which can be determined by a user by modelling the template or choosing the template from a library for Bayesian agents in an application.

The Bayesian agent template definition 10 comprises the Bayesian network 11, template-level metadata 15 and references 12 to the software defined sensors and/or references 13 to the software defined actuators 13, which sensors and actuators can for instance be available in a library. The Bayesian network 11 is determined by nodes, which are connected by directed edges. Node-level meta-data 14 describes or defines behaviour of the nodes in the network 11 and/or define an association of a node with the software defined sensors and/or actuators. The template-level meta-data 15 amongst others determines how data collection is triggered and prescribes lifecycle properties of an instantiated template of the Bayesian agent 7.

This template definition 10 allows an abstraction framework for a Bayesian agent architecture. This framework 10 allows to attribute properties, configuration and metadata at the appropriate level. As a template definition does not comprise the actual implementation of sensors and actuators but references 12 and 13, such framework allows the embedding of Bayesian technology in real applications in a reusable and scalable manner.

Figure 3:
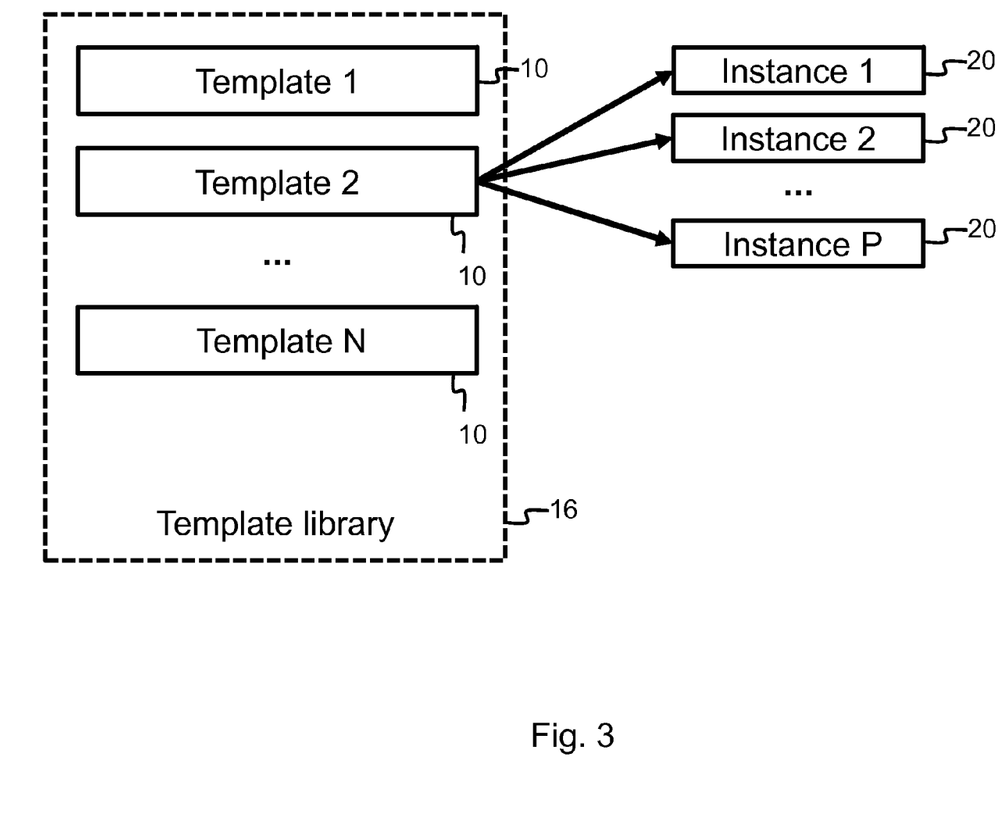
FIG. 3 schematically illustrates an instantiation of templates according to the embodiment of FIG. 1.

FIG. 3 schematically illustrates a library 16 of modelled templates 10 for Bayesian agents. By supplying runtime data to a template 10, the template 10 is instantiated. Hereby, one template can lead to different instantiations 20. For instance, a Bayesian agent template could be instantiated for lmio smart homes, wherein e.g. the connection settings of sensors and actuators differ.

Figure 4:
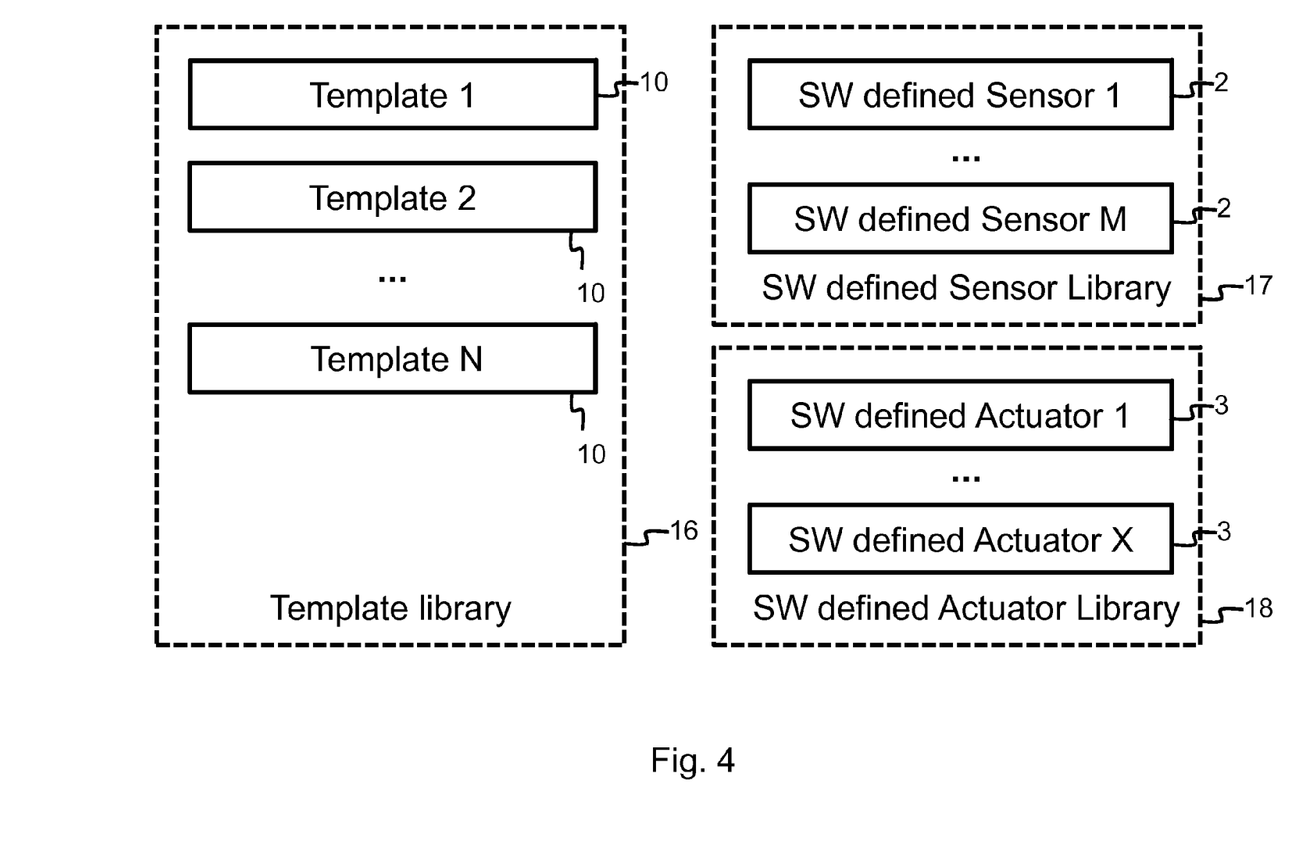
FIG. 4 schematically illustrates the decoupling of templates from sensor and actuator software definitions according to the embodiment of FIG. 1.

FIG. 4 schematically illustrates the decoupling of templates 10 in a template library 16 from software defined sensors 2 and software defined actuators 3, which are available in corresponding libraries 17 and 18. Decoupled software defined sensors and/or actuators can be supplied with runtime data at instantiation of a corresponding template. Then, those sensors 2 and/or actuators 3 will interface with the Bayesian network 1 of the instantiated template 20. Software-defined sensors and actuators can be updated or changed, without the need for adapting the corresponding template.

Figure 5:
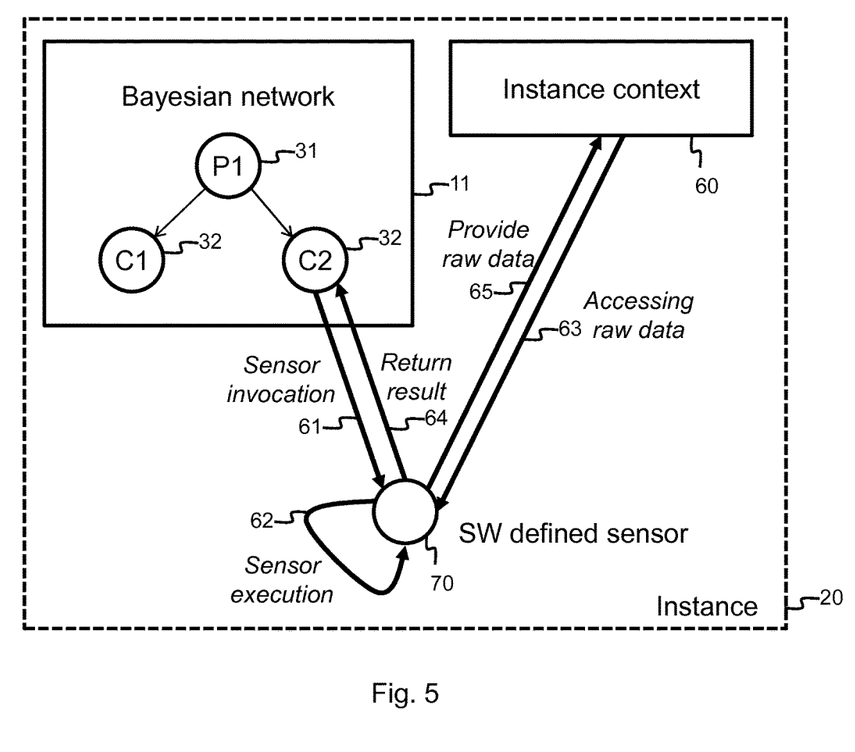
FIG. 5 schematically illustrates communication steps with a sensor according to an embodiment of underlying invention.

FIG. 5 schematically illustrates communication steps with a sensor 70 according to an embodiment of underlying invention. Sensors are executed according the settings defined in the metadata on the node level. The Bayesian agent or network 11 will invoke the sensor 70 (in step 61), as defined by the sensor interface. Sensor 70 is associated with node C2 of the Bayesian network 11 of the instance 20. Node C2 is, as node C1, a child node 32 of the parent node 31, i.e. P1.

Thereafter, the sensor 70 is executed in step 62. Then, the sensor 70 can access raw data, stored and available in the instance context 60. After sensor execution, the sensor will return a result (in step 64). The result will be handled by the instance 20, which will inject the result to the node C2 to which the sensor 70 is attached.

The raw data that is collected at sensor execution time is injected into the instance context 60. The instance context 60 is shared between all nodes in the Bayesian network 11. Also, sensors have access to the instance context 60 at sensor invocation time. This allows specific sensors to take data from the instance context 60 into account and use this to compute states to be returned back to the node in step 64.

The result as returned by a sensor can concern:
an observed state, e.g. "true";
or a set of states as an array, e.g. ["true", 0.8], ["false", 0.2];
and/or produced raw data, e.g. 'temperature 8 degrees'.

In case sensor 70 returns a state, the state is injected to node C2 of network 11. After state injection, the inference algorithm is applied to the complete Bayesian network. In addition, all nodes having actuators attached to them, will be evaluated for possible actuator invocation.

In case the sensor returns a set of states, the instance 20 will inject these states and their associated probabilities back to the node as new prior probabilities, after which the inference algorithm is applied. For instance, assume sensor 70 concerns a weather prediction sensor. In a first case, the sensor can return state "raining" (implying certainty 100%). In case of a set of states, sensor 70 can return data such as "raining with probability 85%" and "sunny probability 15%". These probabilities can be different from the prior probabilities per state defined at the configuration time in the Bayesian network 11.

In case the sensor 70 returns raw data, raw data will be injected into the instance context (step 65).

In an alternative embodiment, data or events can be pushed to the instance 20, without an explicit collection by the sensors associated to the instance 20. In that case, the instance 20 will check whether the resource ID that comes with the data matches the resource ID that is attached to running instances or specific nodes in those instances (which takes precedence over resource ID defined at the instance level). The raw data then is propagated to sensors attached to the nodes matching the resource ID via the instance context 60.

Figure 6:
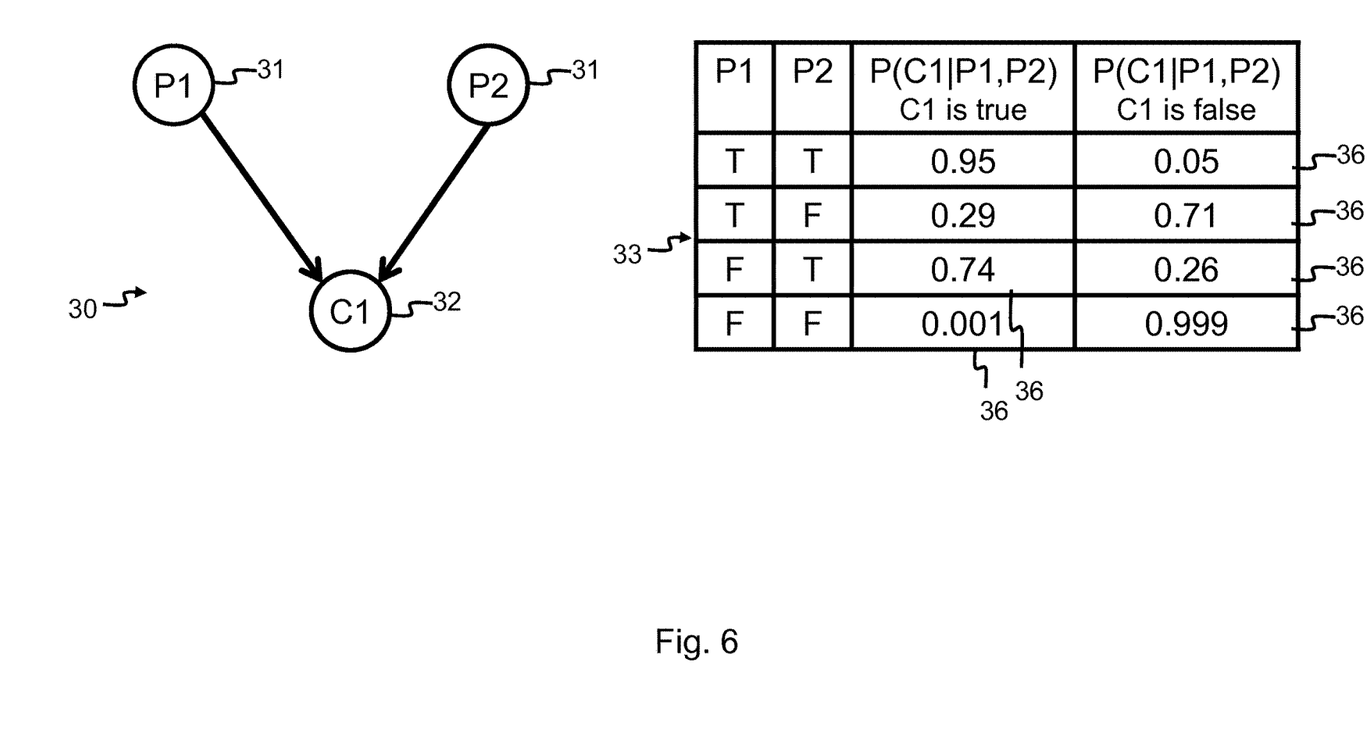
FIG. 6 illustrates a Bayesian network according to an embodiment of underlying invention.

FIG. 6 illustrates a Bayesian network 30 according to an embodiment of underlying invention. The network 30 comprises two nodes P1 and P2, which are parent nodes 31 of node C1. Node C1 is a child node 32 of P1 and P2. The conditional probability table (CPT) 33, illustrates the conditional dependency of C1 to nodes P1 and P2. The values 36 of the conditional probabilities P(C1|P1,P2) are indicated.

The network 30 is an example of monitoring elderly people. Node P1 comprises two states "immobile" and "mobile" and is associated with a sensor, which tracks the movement of a person. Node P2 comprises two states "fallen" and "not fallen" and is associated with an accelerator sensor, which tracks potential acceleration peaks, which could indicate that the person wearing the sensor fell down. Child node C1 two states "needs help" and "is OK", which indicate the probability that the person needs help or not.

Node C1 comprises an association with an actuator, that takes care of calling an ambulance in case probability of the state "needs help" exceeds e.g. 0.8. Node C1 also comprises an association with an actuator, that takes care of sending an alerting sms to a friend or family member, in case the probability of the state "needs help" exceeds e.g. 0.5.

Figure 7:
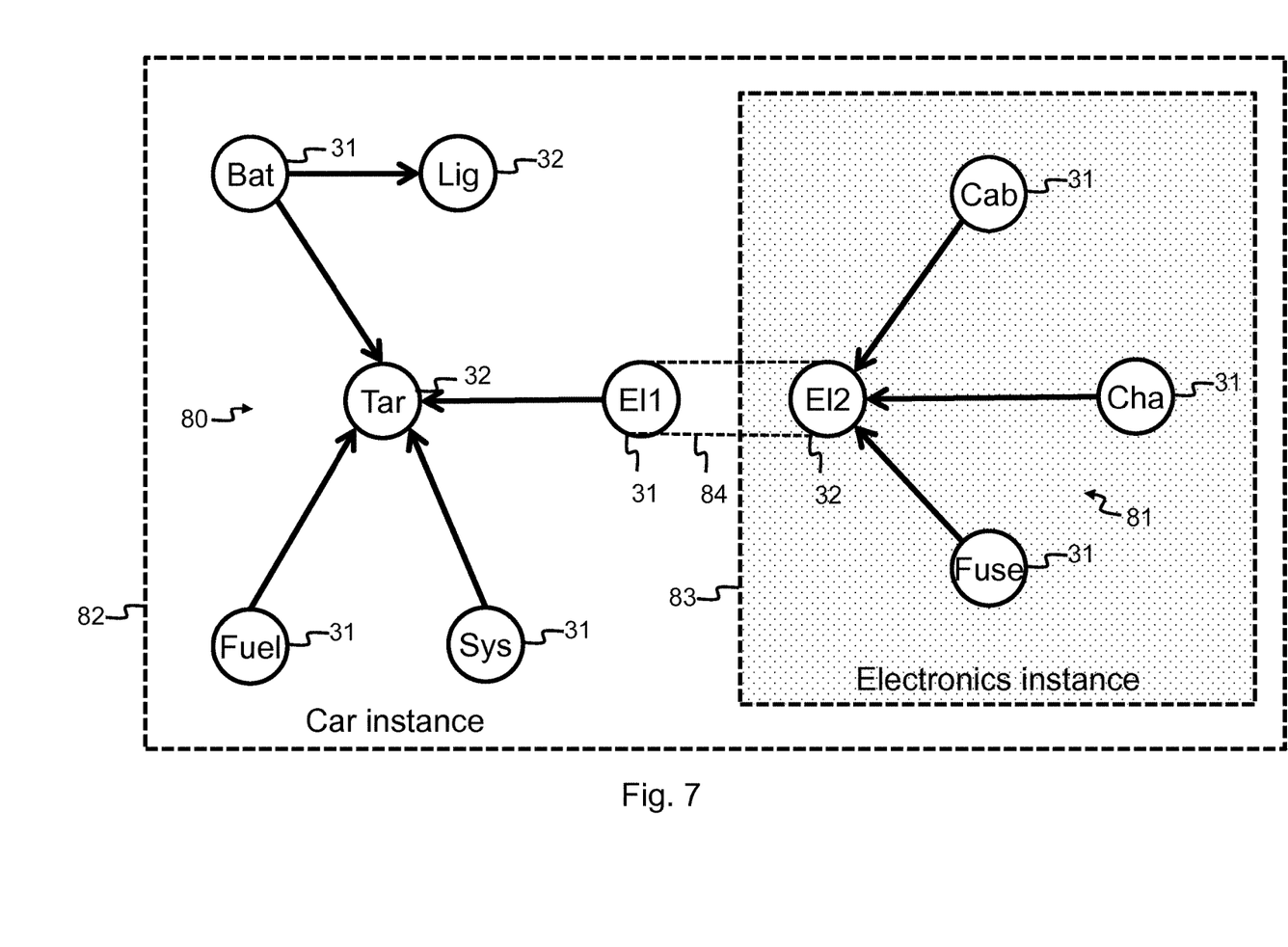
FIG. 7 illustrates a Bayesian instance referring to another Bayesian instance according to an embodiment of underlying invention.

FIG. 7 illustrates a Bayesian instance 82 referring to another Bayesian instance 83 according to an embodiment of underlying invention. Instance 82 comprises network 80 with parent nodes 'Battery' (Bat), 'Electronics1' (El1), 'Fuel' and 'System' (Sys) and further child nodes 'Target' (Tar) and 'Lights' (Lig). The Bayesian network 80 represents a diagnostic model of a car. Node El1 comprises a reference or association 84 to node 'Electronics2' (El2) of another instance with network 81. This Bayesian network 81, which represents the electronics of the car model, comprises nodes El2, 'Cables' (Cab), 'Charger' (Cha) and 'Fuse'. Hereby, the electronics reasoning can be decoupled from the rest of the car model.

The template instances 82 and 83 are linked by the node El1, which is associated with node El2 in the template instance 83 underneath. Nodes El1 and El2 comprise exactly the same number of states. Both instances 82 and 83 run independently. Any change of the posteriori probability of the one or more states of the node El2 will be injected back to the parent node El1 as either a definite state (e.g. yes, no, etc. with probability 1), or as a set of states with probabilities. This state or set will be seen as new prior(s) by other nodes in the parent template instance 82, e.g. node Tar. Hence, node El1 will behave as if it is associated with a sensor collecting data from the electronics instance 83.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. It is to be understood that the terms so used are interchangeable under appropriate circumstances and embodiments of the invention are capable of operating according to the present invention in other sequences, or in orientations different from the one(s) described or illustrated above.

The invention claimed is:

1. A tool system for modelling, instantiating and/or executing a Bayesian agent that collects data from an environment via one or more software defined sensors and that is able to decide to trigger one or more actuators acting on said environment, said system comprising a modelling module adapted to enable a user to determine a template for said Bayesian agent, wherein said template comprises:
a Bayesian network comprising nodes, directed edges between said notes and node-level meta-data, said node-level meta-data at least defining node behavior, and/or an association of a node with a software defined sensor, the software defined sensor being a computer-implemented sensor that is able to collect data from said environment from a physical sensor or from a software system and is able to return said data to said node associated, and/or an association with a software defined actuator, the software defined actuator being a computer-implemented actuator that is able to act on said environment as a result of a decision of said Bayesian network;

template-level metadata at least defining lifecycle properties for said Bayesian agent, including frequency, trigger and/or stop criteria for execution of instances of said template;
wherein said template being suitable to be instantiated and executed as a Bayesian agent instance.

2. The system according to claim 1, wherein said template-level metadata comprises one or more of the following:
frequency setting(s) of executing said Bayesian agent;
trigger setting(s) of executing said Bayesian agent;
stop setting(s) of executing said Bayesian agent;
a data source identification.

3. The system according to claim 1, wherein said template further comprises one or more references to one or more software defined sensors and/or one or more references to one or more software defined actuators.

4. The system according to claim 3, wherein said software defined sensors and actuators are available from a library.

5. The system according to claim 1, wherein said modelling module is further adapted to enable a user to determine sensor-level metadata and/or actuator-level metadata at least defining behaviour of respectively one or more software defined sensors and/or one or more software defined actuators.

6. The system according to claim 1, wherein said node-level metadata comprises one or more of the following:
one or more states corresponding a node;
one or more probabilities corresponding to said one or more states of a node;
a data source identification;
a cost of a sensor observation;
a reference to a node of a Bayesian network of another instance;
a reference to a Markov (n-1) node;
frequency setting(s) of executing a sensor corresponding with a node;
invocation setting(s) of executing an actuator corresponding with a node;
eviction policy setting(s) corresponding with a node.

7. The system according to claim 1, wherein said system is provided with an instantiating module for instantiating said Bayesian agent template, thereby generating said Bayesian agent instance.

8. The system according to claim 1, wherein said system is provided with an executing module for executing said Bayesian agent instance.

9. The system according to claim 8, wherein said executing module is configured to:
evaluate one or more nodes associated with one or more software defined sensors;
execute one or more of said one or more software defined sensors;
provide data from said one or more software defined sensors to one or more associated nodes;
infer said Bayesian network;
evaluate one or more nodes associated with one or more software defined actuators;
execute one or more of said one or more software defined actuators.

10. The system according to claim 9, wherein said provided data from one or more software defined sensors concerns an observed state, a set of states and/or raw data.

11. The system according to claim 10, wherein said provision of sensor data comprises an injection of said observed state or said set of states as new prior probabilities into nodes associated with said sensor.

12. The system according to claim 10, wherein said raw data is provided to memory which is shared between said nodes of said Bayesian agent.

13. The system according to claim 9, wherein said execution of an actuator is dependent on a probability of a state of a node associated with said actuator, whereby said probability is smaller than, equals and/or exceeds a predetermined threshold.

14. A computer-implemented method for modelling, instantiating and/or executing a Bayesian agent that collects data from an environment via one or more software defined sensors and that is able to decide to trigger one or more actuators acting on said environment, wherein said method comprises:
determining a template for said Bayesian agent, said template comprising:
a) a Bayesian network comprising nodes, directed edges between said nodes and node-level meta-data, said node-level meta-data at least defining node behaviour and/or an association of a node with a software defined sensor, the software defined sensor being a computer-implemented sensor that is able to collect data from said environment from a physical sensor or from a software system and is able to return said data to said node associated, and/or an association with a software defined actuator, the software defined actuator being a computer-implemented actuator that is able to act on said environment as a result of a decision of said Bayesian network;
b) template-level metadata at least defining lifecycle properties for said Bayesian agent, including frequency, trigger and/or stop criteria for execution of instances of said template;
and/or instantiating said template;
and/or executing said Bayesian agent instance.

15. A computer-readable medium having computer-executable instructions stored thereon that when executed by one or more processor configure a computer system to perform the following:
determining a template for said Bayesian agent that collects data from an environment via one or more software defined sensors and that is able to decide to trigger one or more actuators acting on said environment, said template comprising:
a) a Bayesian network comprising nodes, directed edges between said nodes and node-level meta-data, said node-level meta-data at least defining node behaviour and/or an association of a node with a software defined sensor, the software defined sensor being a computer-implemented sensor that is able to collect data from said environment from a physical sensor or from a software system and is able to return said data to said node associated, and/or an association with a software defined actuator, the software defined actuator being a computer-implemented actuator that is able to act on said environment as a result of a decision of said Bayesian network;
b) template-level metadata at least defining lifecycle properties for said Bayesian agent, including at least one or frequency, trigger and/or stop criteria for execution of instances of said template;
and/or instantiating said template;
and/or executing said Bayesian agent instance.

* * * * *